(12) United States Patent
Zhang (10) Patent No.: US 10,940,539 B2
(45) Date of Patent: Mar. 9, 2021

(54) TAPPING SHANK CAPABLE OF ENSURING SAFETY OF SCREW TAP

(71) Applicant: SUZHOU JIAJIAYOU MACHINERY MANUFACTURING CO., LTD., Suzhou (CN)

(72) Inventor: Chunming Zhang, Suzhou (CN)

( * ) Notice: Subject to any disclaimer, the term of this patent is extended or adjusted under 35 U.S.C. 154(b) by 0 days.

(21) Appl. No.: 16/600,383

(22) Filed: Oct. 11, 2019

(65) Prior Publication Data

US 2020/0038980 A1 Feb. 6, 2020

Related U.S. Application Data (63) Continuation of application No. PCT/CN2018/085731, filed on May 4, 2018.

(30) Foreign Application Priority Data

May 7, 2017 (CN) .......................... 201710341053.3

(51) Int. Cl.
*B23B 31/08* (2006.01)
*B23G 1/46* (2006.01)

(52) U.S. Cl.
CPC .............. *B23B 31/086* (2013.01); *B23G 1/46* (2013.01); *B23B 2231/54* (2013.01)

(58) Field of Classification Search
CPC ...... B23B 31/086; B23B 2231/54; B23G 1/46
See application file for complete search history.

(56) References Cited

U.S. PATENT DOCUMENTS

| | | | | |
|---|---|---|---|---|
| 3,002,206 A | * | 10/1961 | Johnson | B23B 31/086 408/139 |
| 4,002,348 A | * | 1/1977 | Johnson | B23B 31/086 279/75 |
| 4,014,421 A | * | 3/1977 | Johnson | B23B 31/086 192/48.91 |
| 4,029,429 A | * | 6/1977 | Johnson | B23B 31/086 408/142 |
| 4,174,918 A | * | 11/1979 | Tanaka | B23B 31/086 408/139 |
| 4,364,694 A | | 12/1982 | Miles | |

(Continued)

FOREIGN PATENT DOCUMENTS

CN 105945369 A 9/2016
CN 106964851 A 7/2017
(Continued)

OTHER PUBLICATIONS

Internation Search Report of PCT/CN2018/085731, dated Aug. 1, 2018.

*Primary Examiner* — Eric A. Gates
(74) *Attorney, Agent, or Firm* — Erson IP (Nelson IP)

(57) ABSTRACT

The present invention discloses a tapping shank which mainly consists of axial, radial and deflection comprehensive floating mechanisms and a high-sensitivity rolling clutch safety mechanism. The present invention has an actual safety guarantee in tapping an M1 thread, solves the problems of axial pressure and tension of a main shaft on a screw tap, and eccentric and deflection errors between the screw tap and a bottom hole, ensures the precision of a hole diameter and a longest service life of the screw tap, and is also a high-precision hole machining floating reamer shank.

8 Claims, 5 Drawing Sheets

(56) References Cited

U.S. PATENT DOCUMENTS

| | | | |
|---|---|---|---|
| 4,486,135 A | | 12/1984 | Kazino |
| 5,195,624 A | * | 3/1993 | Eriksson ............... B23B 31/086 |
| | | | 192/138 |
| 7,708,506 B2 | | 5/2010 | Johnson et al. |

FOREIGN PATENT DOCUMENTS

| | | | | |
|---|---|---|---|---|
| EP | 0509143 A1 | * | 10/1992 | ............. B23G 1/465 |
| EP | 3147053 A1 | | 3/2017 | |
| GB | 697061 A | * | 9/1953 | ............... B23G 1/46 |
| GB | 830332 A | * | 3/1960 | ............... B23G 1/46 |
| GB | 1291146 A | * | 9/1972 | ........... B23B 31/086 |

\* cited by examiner

TAPPING SHANK CAPABLE OF ENSURING SAFETY OF SCREW TAP

CROSS-REFERENCE TO RELATED APPLICATIONS

This application is a continuation of International Patent Application No. PCT/CN2018/085731 with a filing date of May 4, 2018, designating the United States, now pending, and further claims priority to Chinese Patent Application No. 201710341053.3 with a filing date of May 7, 2017. The content of the aforementioned applications, including any intervening amendments thereto, are incorporated herein by reference.

TECHNICAL FIELD

The present invention relates to a shank, in particular to a shank for a computer numerical control machine tool.

BACKGROUND OF THE PRESENT INVENTION

In tapping, the fracture of a screw tap in a workpiece is always a greatest and most difficult technical problem in tapping, especially a small-diameter screw tap.

Through patent search, Chinese Patent 20110601 discloses an overload protection type tap chuck, which is the closest prior art to the present invention. The overload protection type tap chuck is a tapping shank combined by two parts including an axial floating mechanism and a sliding friction clutch mechanism.

1. Because of sliding friction clutch, large friction coefficient and impossibility of sensing of a small torque, overload protection cannot protect a small-diameter screw tap that is most likely to fracture.

2. Because of no radial and deflection floating, the screw tap is worn quickly, and the small screw tap is easy to fracture. The aperture after tapping cannot be controlled, and cannot achieve the thread precision requirements, which is the main reason for nonconformity. If a connection gap is increased, or the radial and deflection floating functions are increased to reduce the radial or deflection friction, because no central positioning reference exists, higher speed causes greater swing of the screw tap and "difficult in alignment" becomes a new problem.

3. Because of swing, the chuck cannot be extended too long, and a stepped workpiece cannot be tapped.

4. During rewinding, due to jamming of removed chips and material, the screw tap will also "slip" without rotating with a main shaft, causing that the screw tap is fractured by the main shaft because the screw tap does not rewind with the main shaft.

5. The clutch of the clutch mechanism is not suitable for full mechanized production due to short power arm, strong pressure intensity and fast wear, although frequently adjusted manually.

6. Since a cutting edge of the screw tap becomes continuously blunt in the tapping and the axial floating spring bears the varied initial axial pressure of tapping, the tapping depth of a computer numerical control machine tool cannot be controlled and the tapping with depth requirements cannot be satisfied.

SUMMARY OF PRESENT INVENTION

The main purpose of the present invention is to prevent the fracture of a screw tap, and especially a small screw tape which is easiest to fracture.

In order to achieve the above purpose, the present invention adopts the following technical solutions:

1. A tapping shank capable of ensuring safety of a screw tap mainly consists of comprehensive floating mechanisms and a safety clutch mechanism. The comprehensive floating mechanisms and the safety clutch mechanism mainly comprise a shank, a rolling steel ball, an axially dimpled rolling clutch, a rolling clutch steel ball, a cage, an axially dimpled clutch floating member, a rolling member, a radial floating member, a rolling member, a positioning member, a rolling steel ball, a chuck, a torque adjusting nut, a spring and an axial floating spring. The shank is movably connected with the axially dimpled rolling clutch through the rolling steel ball; the axially dimpled rolling clutch is movably connected with the axially dimpled clutch floating member through the rolling clutch steel ball; the rolling clutch steel ball is provided with the cage; the axially dimpled clutch floating member is movably connected with the radial floating member through the rolling member; the radial floating member is movably connected with the positioning member through the rolling member; and the positioning member is movably connected with the chuck through the rolling steel ball.

2. For the axially dimpled rolling clutch, a rolling groove of the rolling steel ball is formed on an outer circle, and, a steel ball socket is arranged on a plane.

3. For the axially dimpled clutch floating member, a deflection floating spring hole, a rolling groove of the rolling member and a steel ball socket are arranged on a plane.

4. A tapping shank capable of ensuring safety of a screw tap is provided. The tapping shank mainly consists of comprehensive floating mechanisms and a steel ball type sliding friction safety clutch mechanism. The comprehensive floating mechanisms and the steel ball type sliding friction safety clutch mechanism mainly comprise a shank, a rolling steel ball, a slotted sliding clutch, a sliding clutch steel ball, a radially dimpled clutch floating member, a rolling member, a radial floating member, a rolling member, a positioning member, a rolling steel ball, a chuck, a torque adjusting nut, a spring and an axial floating spring; the shank is movably connected with the slotted sliding clutch through the rolling steel ball; the slotted sliding clutch is movably connected with the radially dimpled clutch floating member through the sliding clutch steel ball; the radially dimpled clutch floating member is movably connected with the radial floating member through the rolling member; the radial floating member is movably connected with the positioning member through the rolling member; and the positioning member is movably connected with the chuck through the rolling steel ball.

5. For the slotted sliding clutch, a rolling groove of the rolling steel ball is formed on an outer circle, and a steel ball slot is arranged on a plane.

6. For the radially dimpled clutch floating member, a deflection floating spring hole and a rolling groove of the rolling member are arranged on a plane, and a steel ball socket is arranged on an outer circle.

7. For the shank, a rolling groove of the rolling steel ball is formed on an inner circle, a circle of dimples are arranged on the plane, and a torque adjusting thread is arranged on an outer circle and is connected with a torque adjusting nut with a screw hole on the plane.

8. A circle of dimples are arranged on the plane of the positioning member, and are movably connected with the dimples on the plane of the shank through a steel ball on the cage; a rolling groove of the rolling member is arranged on an outer circle, and a long groove is formed in an inner circle.

The tapping shank capable of ensuring safety of a screw tap in the present invention has the beneficial effects:

1. The comprehensive floating mechanisms of the tapping shank have axial, radial and deflection floating functions, and thus can satisfy the needs of any two comprehensive floatation, or a single need, thereby not only eliminating the axial pressure or tension of a main shaft to the screw tap, but also eliminating the eccentricity or deflection error caused by the manufacture, assembly and elongation of the parts of the shank, so that the center line of the screw tap and the center line of a thread bottom hole can be freely coincident. In tapping, a cutting edge of the screw tap is evenly stressed, the wear is minimized, thereby not only ensuring the longest service life of the screw tap, but also ensuring the accuracy and smoothness of the hole diameter, also reducing the number of machine tool changes, reducing the cost of the tool, and also avoiding the dependence on the machining accuracy of the part in order to ensure the concentricity with the shank.

2. An overload protection mechanism of a pure rolling clutch in the tapping shank has a small friction coefficient and a sensitivity increased by about ten times compared with a full sliding friction clutch of the prior art, and can accurately adjust the maximum torque that can be borne by the screw tap. Through combination with the comprehensive floating mechanisms, not only the structure is optimized, but also the functions are more comprehensive and the performance is higher. The small M1 thread also has the safety guarantee of overload protection. In the range of tapping overload protection, the present invention enters an unprecedented blank field, and breaks through the disadvantages that the tapping shanks in China and abroad are weak in fracture resistance and are easiest to fracture and especially small screw taps below M3 conduct highly difficult thread processing with strict technical requirements and cannot provide overload safety protection. The tapping shank combines the comprehensive floating and the rolling clutch on the computer numerical control machine tool, which not only solves the technical problem of easiest fracture in tapping, but also provides protection during overload in large and small thread tapping.

3. The floating mechanism and the safety clutch mechanism are connected by fusion; the floating mechanism has a clutch mechanism, and the clutch mechanism has a floating mechanism to form an inseparable part. Due to the simplification of the structure, not only the production cost is reduced by one-third, but also the concentricity and the verticality of the chuck and the shank are controlled by a positioning reference more easily, so that the chuck does not swing when rotating, and can float when tapping.

4. Due to central positioning, the chuck can be extended and the tapping is not limited by a stepped workpiece.

5. By means of a rewinding anti-slip column and a rewinding anti-slip one-way slot, the tapping shank prevents "slipping" during rewinding and prevents the screw tap from being fractured because the screw tap does not rewind with the main shaft.

6. The tapping shank has a constant force device to keep the chuck at constant axial initial pressure, thereby ensuring a consistent tapping depth.

7. The power arm of the clutch is longer than the power arm of the prior art, so that the clutch part has a small pressure and is not easy to wear. In addition, the clutch part has a wear-resistant groove, which further increases the force area and reduces the intensity of pressure. Therefore, the clutch is more durable, does not need to manually adjust the torque, and is more in line with the full mechanical automatic production.

8. Since the chuck is a hollow structure, the chuck can be connected with water or oil-related mechanisms and can perform the functions of chip removal, cooling and lubrication.

DESCRIPTION OF THE DRAWINGS

FIG. 3 is a part diagram of a slotted sliding clutch, an axially dimpled rolling clutch and a cage a;

In the figures: 1 shank; 2 rolling steel ball; 3 slotted sliding clutch; 4 axially dimpled rolling clutch; 5 sliding clutch steel ball; 6 rolling clutch steel ball; 7 cage a; 8 radially dimpled clutch floating member; 9 axially dimpled clutch floating member; 10 rolling member a; 11 radial floating member; 12 rolling member b; 13 positioning member; 14 rolling steel ball; 15 chuck; 16 torque adjusting nut; 17 spring; 18 cage b; 19 steel ball a; 20 deflection floating spring; 21 axial floating spring; 22 cage c; 23 steel ball b; 24 constant force device; 25 rewinding anti-slip column; 26 rolling block; and 27 stop block.

DETAILED DESCRIPTION OF PREFERRED EMBODIMENTS

The present invention relates to two types of tapping shanks including a steel ball type rolling friction clutch type and a sliding friction clutch type. The rolling friction clutch type mainly solves the need, for a higher clutch sensitivity than the sliding friction clutch in small thread processing.

The torque transmission sequence of the rolling friction clutch type is: 1 a shank, 2 a rolling steel ball, 4 an axially dimpled rolling clutch, 6 a rolling clutch steel ball, 9 an axially dimpled clutch floating member, 10 a rolling member a, 11 a radial floating member, 12 a rolling member b, 13 a positioning member, 14 a rolling steel ball, and 15 a chuck, and finally a screw tap or a reamer is driven to rotate.

The torque transmission sequence of the sliding friction clutch type is: 1 a shank, 2 a rolling steel ball, 3 a slotted sliding clutch, 5 a sliding clutch steel ball, 8 a radially dimpled clutch floating member, 10 a rolling member a, 11 a radial floating member, 12 a rolling member b, 13 a positioning member, 14 a rolling steel ball, and 15 a chuck, and finally a screw tap or a reamer is driven to rotate.

Figure 1:
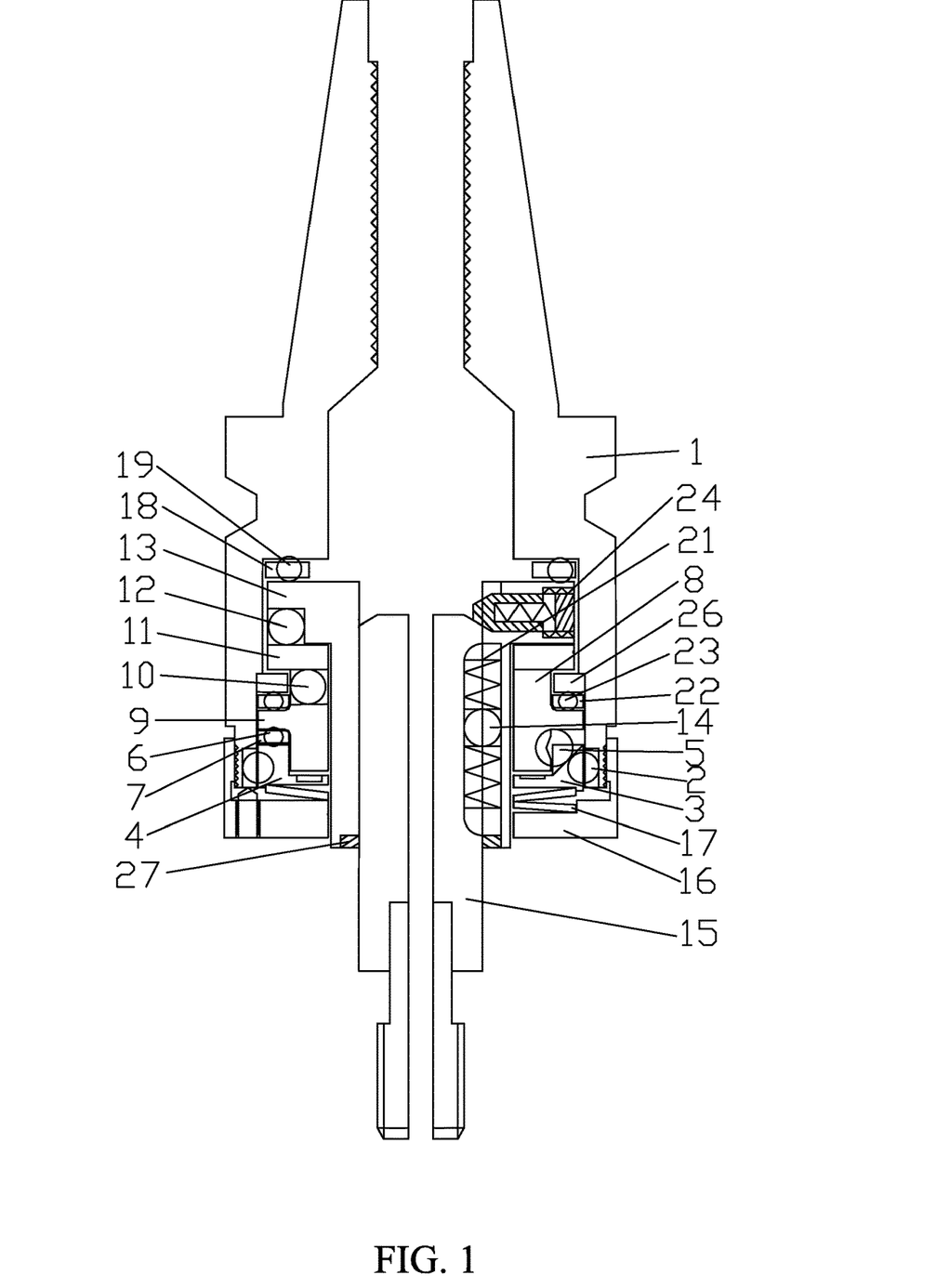
FIG. 1 is an overall structural diagram of a tapping shank.
Figure 2:
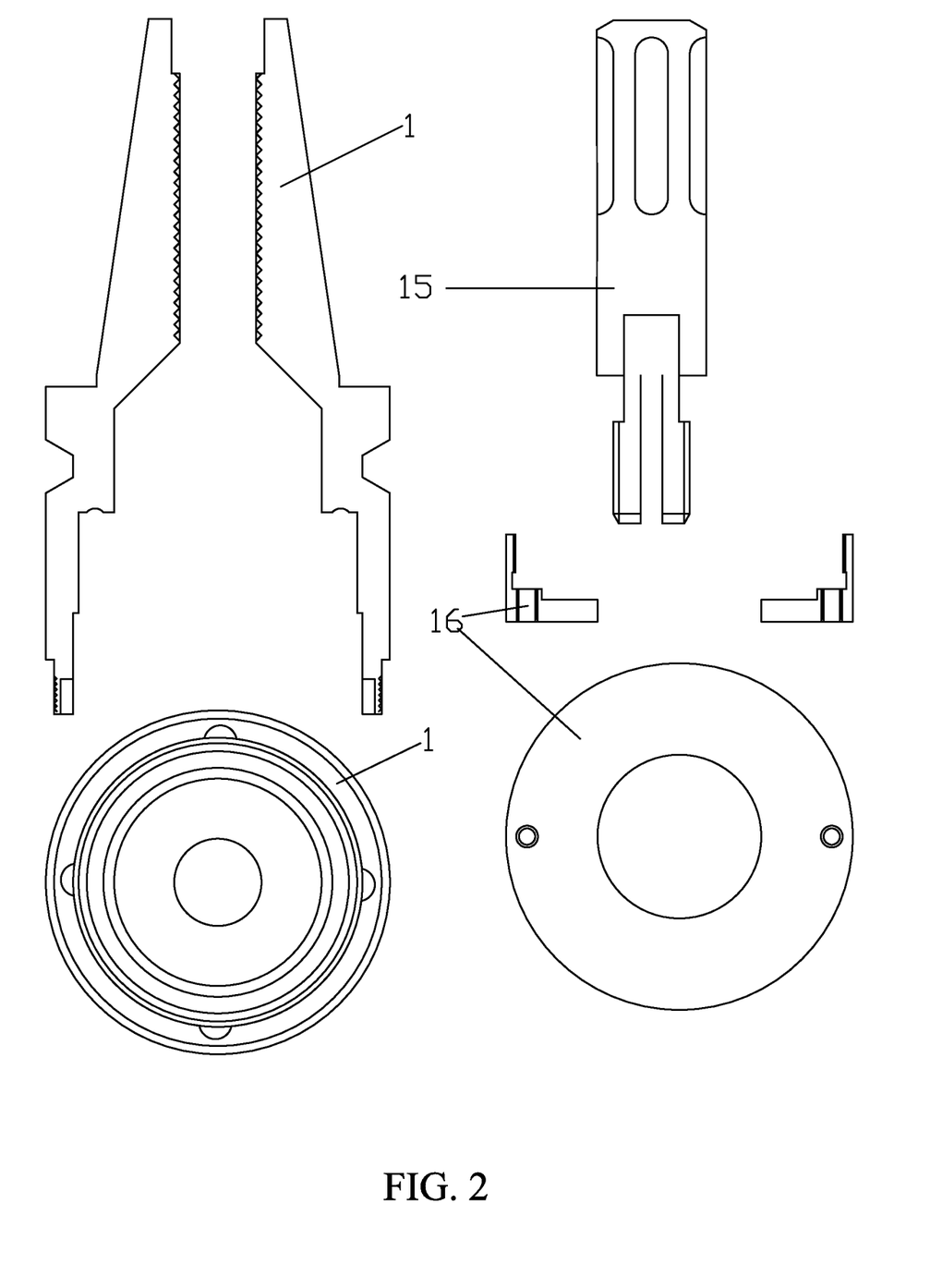
FIG. 2 is a part diagram of a shank, a chuck and a torque adjusting nut.

The shank 1 is connected with the main shaft, and the external thread is connected with the torque adjusting nut 16. When the torque is adjusted, a positioning screw on the plane of the torque adjusting nut 16 is loosened, the adjusting nut is rotated and the positioning screw is tightened.

Figure 3:
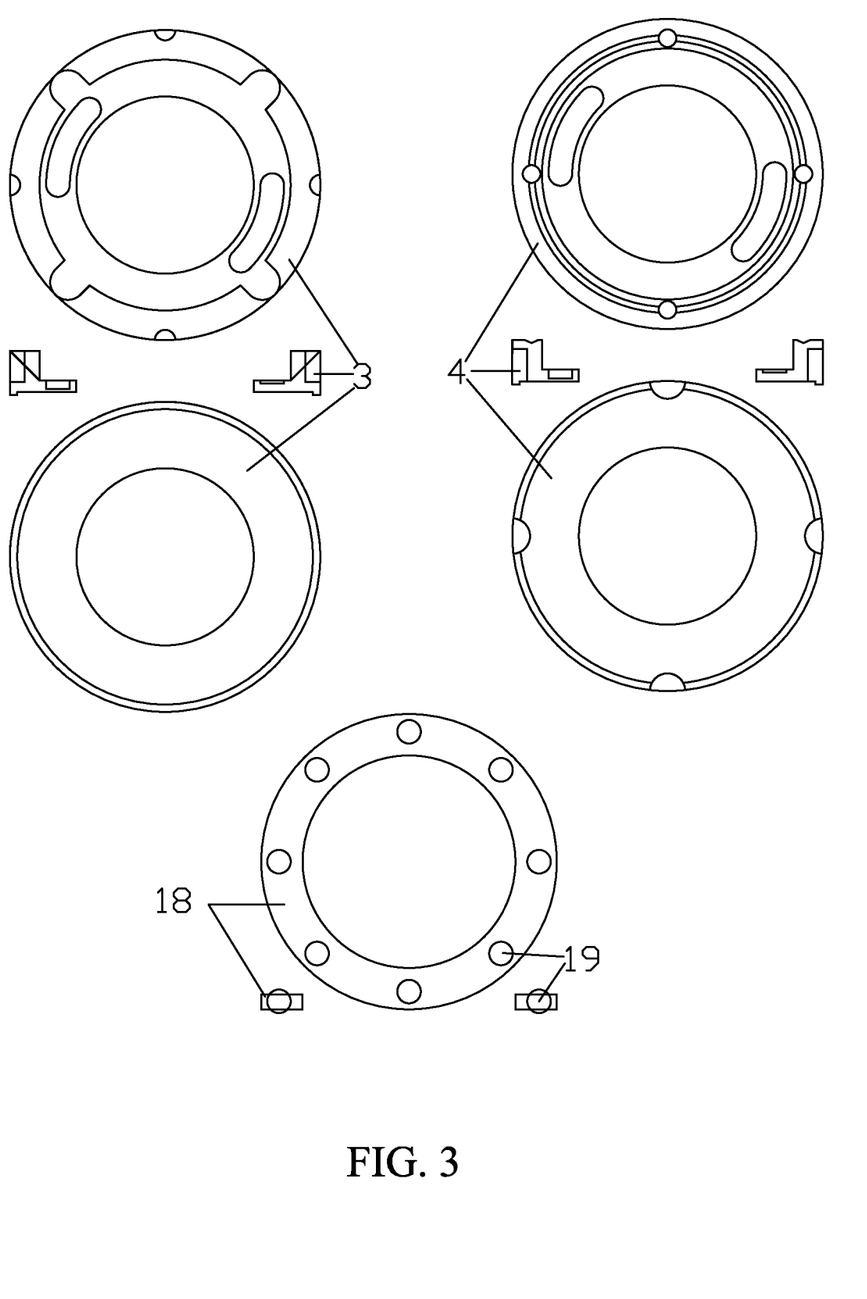

A rolling groove of the, rolling steel ball 2, the axially dimpled rolling clutch 4 connected with the rolling steel ball 2, or the slotted sliding clutch 3 are formed on an inner circle of the shank 1; the rolling groove of the rolling steel ball 2 is also formed on an outer circle; a rewinding anti-slip one-way slot is formed on the plane; the axially dimpled rolling clutch 4 has dimples on the plane; and the slotted sliding clutch 3 has a slot on the plane.

Figure 4:
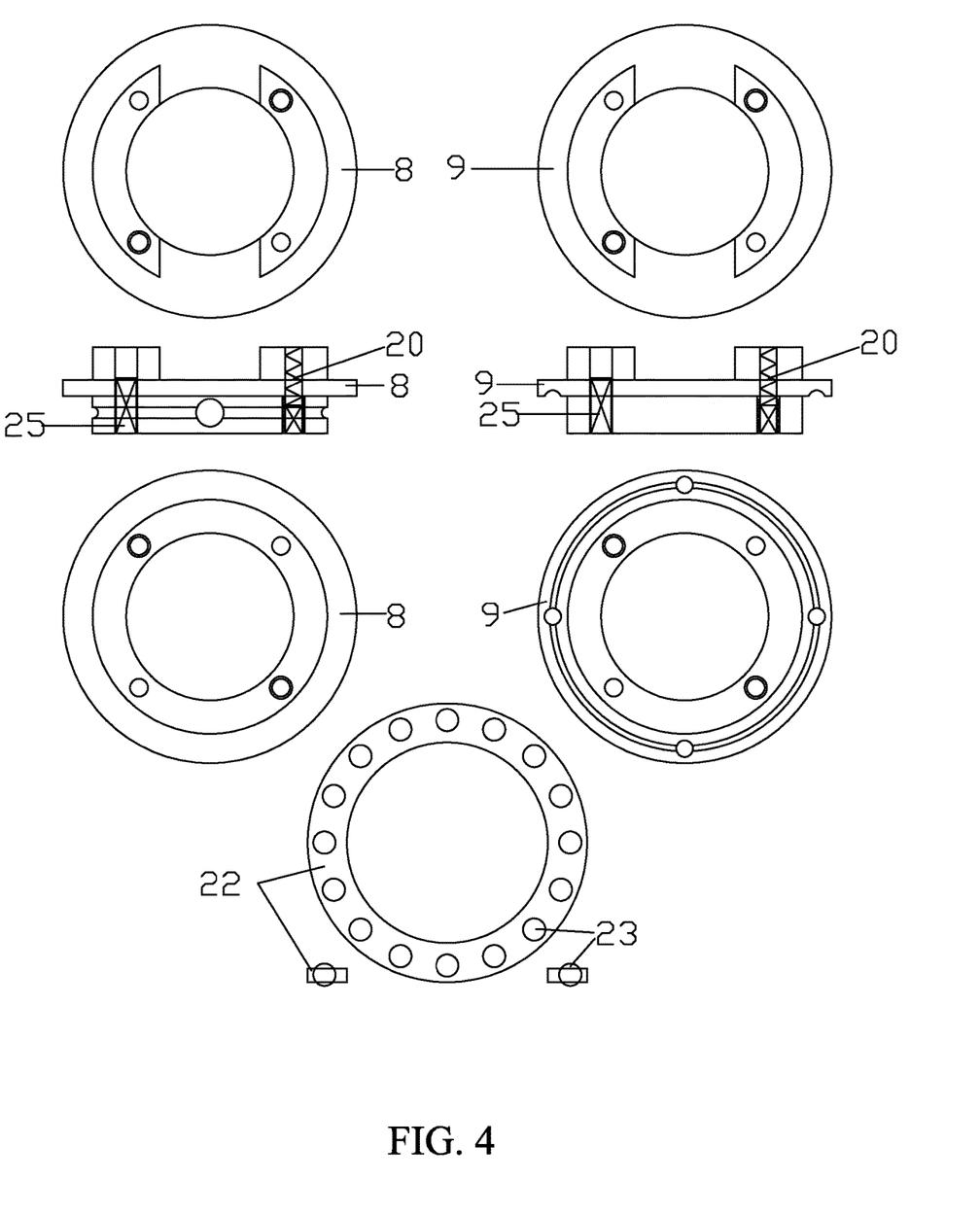
FIG. 4 is a part diagram of a radially dimpled clutch floating member, an axially dimpled clutch floating member and a cage b.

The slotted sliding clutch 3 is movably connected with the radially dimpled clutch floating member 8 through the sliding clutch steel ball 5. When the tapping resistance is greater than the torque set by a screw tap, the sliding clutch steel ball 5 slides, and conducts small radial floating while sliding and rotating on the dimples of the radially dimpled clutch floating member 8, and generates an axial thrust for the axially dimpled rolling clutch 4 and the spring 17. The screw tap is protected because the chuck does not rotate with the shank 1.

The axially dimpled rolling clutch 4 is movably connected with the axially dimpled clutch floating member 9 through the rolling clutch steel ball 6. When the tapping resistance is greater than the torque set by the screw tap, the rolling clutch steel ball 6 rolls to leave the dimples on the axially dimpled clutch floating member 9 and the axially dimpled rolling clutch 4, and conducts small radial floating while rolling and rotating, and generates an axial thrust for the axially dimpled rolling clutch 4 and the, spring 17. The screw tap is protected because the chuck does not rotate with the shank 1. The cage a7 maintains the spacing of the rolling clutch steel balls 6.

A rewinding anti-slip hole, a screw hole and a rolling groove of the rolling member a10 are formed on the plane of the radially dimpled clutch floating member 8 or the axially dimpled clutch floating member 9. The axially dimpled clutch floating member 9 has dimples on the plane. The dimples have a circle of wear-resistant grooves. The radially dimpled clutch floating member 8 has dimples on the outer circle, and the dimples also have a circle of wear-resistant grooves to perform the effects of increasing the stress area, reducing the pressure intensity and enhancing wear resistance on the movably position.

A spring and a rewinding anti-slip column 25 are arranged in the rewinding anti-slip hole on the plane of the radially dimpled clutch floating member 8 or the axially dimpled clutch floating member 9. The rewinding anti-slip column 25 is movably connected with the rewinding anti-slip one-way slot, of the slotted sliding clutch 3 or the axially dimpled rolling clutch 4. The anti-slip one-way slot is a bevel with a high end and a low end. One end is connected with the plane in a bevel form, and the other end forms a step shape with the plane. During rewinding, the steps on the anti-slip one-way slot directly transmit the rewinding torque to the radially dimpled clutch floating member 8 or the axially dimpled clutch floating member 9 through the anti-slip column 25. The rewinding torque is not transmitted through the sliding clutch steel ball 5 or the rolling clutch steel ball 6.

Figure 5:
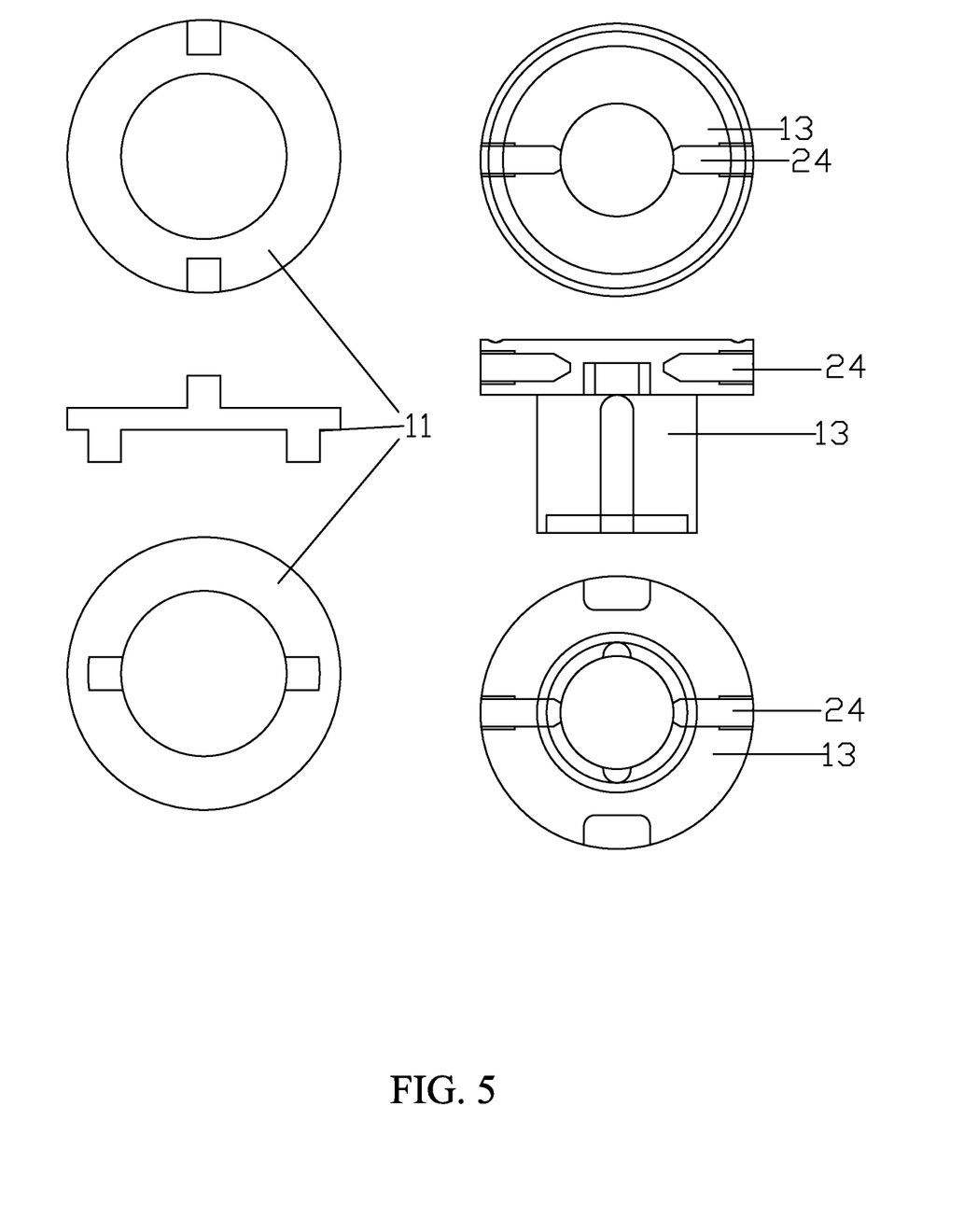
FIG. 5 is a part diagram of a radial floating member and a positioning member.

For the radially dimpled clutch floating member 8 or the axially dimpled clutch floating member 9, a deflection floating spring 20 and a screw are formed in the screw hole on the plane. The screw is used to adjust the contact force of the deflection floating spring 20 when connected with the radial floating member 11, the rolling member b12, the positioning member 13, the steel ball a19 and the shank 1. By taking the dimples on the inner circle of the shank 1 as a central positioning reference, the verticality and the concentricity of the positioning member 13 are ensured and the positioning member 13 can have radial or deflection floating space.

For the radially dimpled clutch floating member 8 or the axially dimpled clutch floating member 9, a cage c22 is arranged on the plane; the cage c22 is provided with a steel ball b23 movably connected with a rolling block 26; and when "slip" in tapping, rolling friction can be conducted to avoid sliding friction and improve clutch sensitivity.

The radially dimpled clutch floating member 8 or the axially dimpled clutch floating member 9 is a clutch and a floating component, and mixes two mechanisms with different functions to form an inseparable part, which not only makes the structure simple, but also makes it easy to control the chuck not to swing during rotation.

The rolling groove on the plane of the radially dimpled clutch floating member 8 or the axially dimpled clutch floating member 9 transmits the torque to the radial floating member 11 through the rolling member a10 in the rolling groove; the rolling member b12 is connected with the rolling groove on the outer circle of the positioning member 13; and then the torque is transmitted to the positioning member 13 through the rolling member b12.

The radial floating member 11 is an ordinary cross coupling, and has X-direction and Y-direction steps on an upper plane and a lower plane. Through the radial floating of the rolling members 10 and 12, the radial deviation of the screw tap and the thread bottom hole is eliminated, and the friction of the screw tap is reduced to reduce the wear, so that the aperture and the finish are ensured during tapping or reaming.

A constant force screw hole is formed on the outer circle of the positioning member 13. Constant force devices such as a screw, a spring and a taper column are arranged in the hole. The screw is rotated to increase or decrease the radial force of the taper column, so as to keep the chuck at constant axial initial pressure during tapping and ensure a consistent tapping depth.

The chuck 15 is arranged in the inner circle of the positioning member 13. The outer circle of the chuck 15 and the inner circle of the positioning member 13 have long grooves. The rolling steel balls 14 or the axial floating springs 21 are arranged in the grooves. The rolling steel balls 14 and the axial floating springs 21 can also be put into one groove. When the screw tap is overloaded, and "slips" without rotating, or when the main shaft moves downward and is not synchronous with a pitch, the chuck 15 can float axially in the inner hole of the positioning member 13. At this time, the axial floating springs 21 is compressed, thereby eliminating the direct axial pressure generated by the main shaft to the screw tap. When the main shaft rewinds upward and is not synchronous with the pitch of the screw tap, the axial floating springs 21 is also compressed, thereby eliminating the direct axial tension generated by the main shaft to the screw tap. After the axial pressure or tension is eliminated, the axial floating spring 21 is automatically reset.

A circle of dimples are, arranged on the plane of the positioning member 13, and are movably connected with a circle of dimples on the plane of the shank 1 through the steel ball a19 in the cage b18. The shank 1 as the reference plays a role of center positioning, so as to ensure that the screw tap does not swing when rotating, and can float when tapping. With the positioning of concentricity and verticality, the radial floating and the deflection floating will not cause the chuck to swing, and the chuck 15 can be extended when a stepped workpiece is tapped.

The lower part of the inner circle of the positioning member 13 has a stop block 27 to prevent the rolling steel ball 14 or the axial floating spring 21 from falling.

The positioning member 13 transmits the torque to the chuck 15 through the rolling steel ball 14, and drives the screw tap or the reamer to rotate; and the clutch torque only needs to be increased during reaming.

When hard material is tapped, if the load exceeds a limited torque, the screw tap is protected by "slip"; the main shaft rotates and the screw tap does not rotate; during rewinding, the screw tap rotates with the main shaft and rewinds; the tapping and the rewinding are repeated in this way several times, and the tapping is in place.

The technical features of the tapping shank are not only suitable for tapping and reaming, but also suitable for robot thread assembly and other jobs. Substitutions that can be directly derived or contemplated from the disclosure of the present invention by those ordinary skilled in the art are considered to be the same or equivalent protection scope of the present invention.

I claim:

1. A tapping shank capable of ensuring safety of a screw tap, the tapping shank is consisted of comprehensive floating mechanisms and a safety clutch mechanism, wherein the comprehensive floating mechanisms and the safety clutch mechanism comprise a shank (1) a rolling steel ball (2), an axially dimpled rolling clutch (4), a rolling clutch steel ball (6), a first cage (a, 7), an axially dimpled clutch floating member (9), a first rolling member (a, 10), a radial, floating member (11), a second rolling member (b, 12), a positioning member (13), a rolling steel ball (14), a chuck (15), a torque adjusting nut (16), a spring (17) and an axial floating spring (21); the shank (1) is movably connected with the axially dimpled rolling clutch (4) through the rolling steel ball (2); the axially dimpled rolling clutch (4) is movably connected with the axially dimpled clutch floating member (9) through the rolling clutch steel ball (6); the rolling clutch steel ball (6) is provided with the first cage (a, 7); the axially dimpled clutch floating member (9) is movably connected with the radial floating member (11) through the first rolling member (a, 10); the radial floating member (11) is movably connected with the positioning member (13) through the second rolling member (b, 12); and the positioning member (13) is movably connected with the chuck (15) through the rolling steel ball (14).

2. The tapping shank capable of ensuring safety of a screw tap according to claim 1, wherein for the axially dimpled rolling clutch (4), a rolling groove of the rolling steel ball (2) is formed on an outer circle, and a steel ball socket is arranged on a plane.

3. The tapping shank capable of ensuring safety of a screw tap according to claim 1, wherein for the axially dimpled clutch floating member (9), a deflection floating spring (20) hole, a rolling groove of the first rolling member (a, 10) and a steel ball socket are arranged on a plane.

4. The tapping shank capable of ensuring safety of a screw tap according to claim 1, wherein for the shank (1), a rolling groove of the rolling steel ball (2) is formed on an inner circle, a circle of dimples are arranged on the plane, and a torque adjusting thread is arranged on an outer circle and is connected with a torque adjusting nut (16) with a screw hole on the plane.

5. The tapping shank capable of ensuring safety of a screw tap according to claim 1, wherein a circle of dimples are arranged on the plane of the positioning member (13), and are movably connected with the dimples on the plane of the shank (1) through a steel ball (a, 19) on a second cage (b, 18); a rolling groove of the second rolling member (b, 12) is arranged on an outer circle, and a long groove is formed in an inner circle.

6. A tapping shank capable of ensuring safety of a screw tap, the tapping shank is consisted of comprehensive floating mechanisms and a steel ball type sliding friction safety clutch mechanism, wherein the comprehensive floating mechanisms and the steel ball type sliding friction safety clutch mechanism comprise a shank (1), a rolling steel ball (2), a slotted sliding clutch (3), a sliding clutch steel ball (5), a radially dimpled clutch floating member (8), a first rolling member (a, 10), a radial floating member (11), a second rolling member (b, 12), a positioning member (13), a rolling steel ball (14), a chuck (15), a torque adjusting nut (16), a spring (17) and an axial floating spring (21); the shank (1) is movably connected with the slotted sliding clutch (3) through the rolling steel ball (2); the slotted sliding clutch (3) is movably connected with the radially dimpled clutch floating member (8) through the sliding clutch steel ball (5); the radially dimpled clutch floating member (8) is movably connected with the radial floating member (11) through the first rolling member (a, 10); the radial floating member (11) is movably connected with the positioning member (13) through the second rolling member (b, 12); and the positioning member (13) is movably connected with the chuck (15) through the rolling steel ball (14).

7. The tapping shank capable of ensuring safety of a screw tap according to claim 6, wherein for the slotted sliding clutch (3), a rolling groove of the rolling steel ball (2) is formed on an outer circle, and a steel ball slot is arranged on a plane.

8. The tapping shank capable of ensuring safety of a screw tap according to claim 6, wherein for the radially dimpled clutch floating member (8), a deflection floating spring (20) hole and a rolling groove of the first rolling member (a, 10) are arranged on a plane, and a steel ball socket is arranged on an outer circle.

* * * * *